United States Patent [19]

Steilen

[11] 4,408,704
[45] Oct. 11, 1983

[54] FEED CUP ASSEMBLY WITH FLEXIBLE METERING GATE

[75] Inventor: Ronald M. Steilen, Ankeny, Iowa

[73] Assignee: Deere & Company, Moline, Ill.

[21] Appl. No.: 289,629

[22] Filed: Aug. 3, 1981

[51] Int. Cl.³ .............................................. B65D 88/54
[52] U.S. Cl. ...................................... 222/312; 111/77; 222/368; 222/556
[58] Field of Search ............... 222/368, 290, 291, 312, 222/313, 315, 329, 406, 517, 556, 349, 350; 111/77

[56] References Cited

U.S. PATENT DOCUMENTS 3,464,376  9/1969  Johnson et al. ...................... 222/313
3,620,419  11/1971  Bailey ................................. 222/313

FOREIGN PATENT DOCUMENTS 42934    7/1910  Austria ............................... 222/313
1247957  8/1967  Fed. Rep. of Germany ........ 111/77
715046   9/1977  U.S.S.R. ............................. 111/77

Primary Examiner—H. Grant Skaggs

[57] ABSTRACT

An adjustable and flexible metering gate for a fluted feed cup assembly on a grain drill. The metering gate is fabricated from a flexible material, and the adjusting lever for the gate is located on the side of the cup opposite the portion of the fluted feed roll which is exposed to the grain so that the gate can flex and pass foreign objects without damage and then return to its original position. The feed cup is fabricated from plastic.

10 Claims, 7 Drawing Figures

FEED CUP ASSEMBLY WITH FLEXIBLE METERING GATE

BACKGROUND OF THE INVENTION

The present invention relates generally to a seeding implement and more specifically to a fluted feed cup assembly of the type commonly used on grain drills or other equipment to meter the correct quantity of seed to be sown.

Feed cup assemblies for seeding implements such as grain drills typically have included a fluted feed roll mounted on a feed shaft and shiftable laterally with respect to the cup to adjust seed rate by changing the area of the fluted roll which contacts the grain. An adjustable feed gate is pivotally connected to the feed cup sidewalls below the fluted roll and to a latch or adjusting handle connected to the sidewall nearest the fluted roll. The handle is moved to adjust the position of the gate relative to the feed roll to accommodate different types and sizes of grain. Seed is directed between the fluted feed roll and the gate and drops through a seed tube into a seed boot or the like. It is not unusual for hardware or other foreign objects to be mixed in the grain, and when these objects are forced between the relatively rigid metering gate and the feed roll, damage to the gate or feed cup often results.

SUMMARY OF THE INVENTION

It is therefore an object of the present invention to provide an improved feed cup assembly for a seeding implement.

It is another object of the invention to provide a feed cup assembly fabricated from plastic and highly resistant to breakage by foreign objects which are substantially larger than the seed being metered.

It is another object of the present invention to provide an implement seed cup assembly which will permit hardware or other foreign objects to pass through without damage to the cup and without sacrificing metering adjustability or precision.

It is a further object of the invention to provide an improved feed gate for a fluted feed cup assembly. It is yet another object to provide an improved adjusting handle arrangement for such a feed gate.

It is another object of the present invention to provide an improved feed gate arrangement which permits the gate to flex and pass foreign objects without damage and then return to its original position.

In accordance with the above objects, an adjustable and flexible metering gate fabricated from glass-filled nylon is pivoted within a plastic feed cup and attached to an adjusting handle at the side of the gate opposite the feed roll side of the cup. The seed rate is controlled by sliding the feed roll into or out of the feed cup and exposing only a portion of the feed roll to the grain and to any foreign objects in the grain. Since the gate is made of a flexible material and the adjusting lever is connected on the side of the feed cup opposite the exposed area, sufficient flexibility is obtained to permit foreign objects to pass without damage to the seed cup assembly. Once the foreign objects pass, the gate returns to its original adjusted position to assure proper metering of the seed being drilled.

These and other objects, features and advantages of the present invention will become apparent upon a reading of the detailed description taken with the accompanying drawings.

DESCRIPTION OF THE PREFERRED EMBODIMENT

Figure 1:
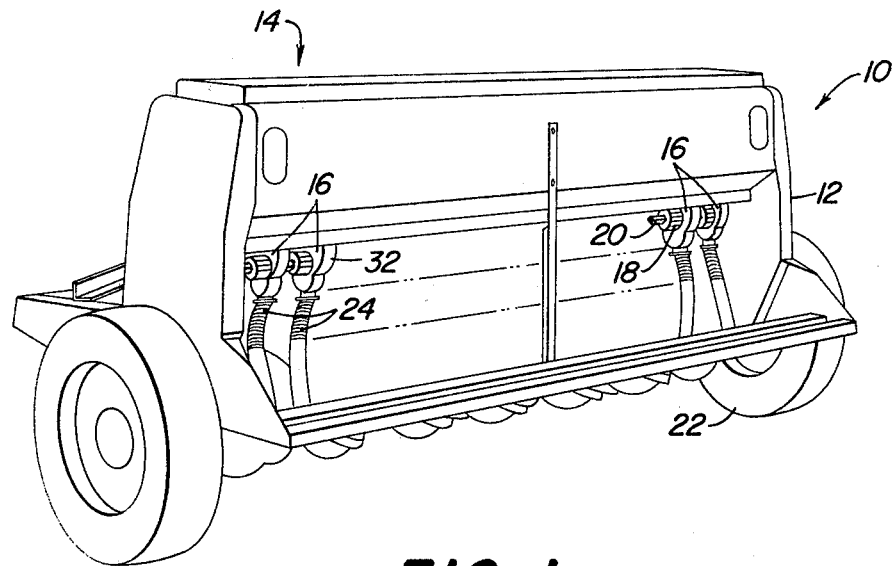
FIG. 1 is a rear perspective view of a grain drill with seed cup assemblies attached.

Referring to FIG. 1, therein is shown a seeding implement 10 including a frame 12 supporting seed grain box structure 14 which opens downwardly into seed metering devices or fluted feed cup assemblies designated generally at 16. Fluted feed rolls 18 are driven by a square drive shaft 20 which in turn is operably connected to ground wheels 22 for metering the proper amount of seed into seed tubes 24 as the implement 10 is towed forwardly through a field. The shaft 20 is transversely adjustable to move the feed rolls 18 into or out of their corresponding assemblies 16 to meter more or less seed as desired.

Figure 2:
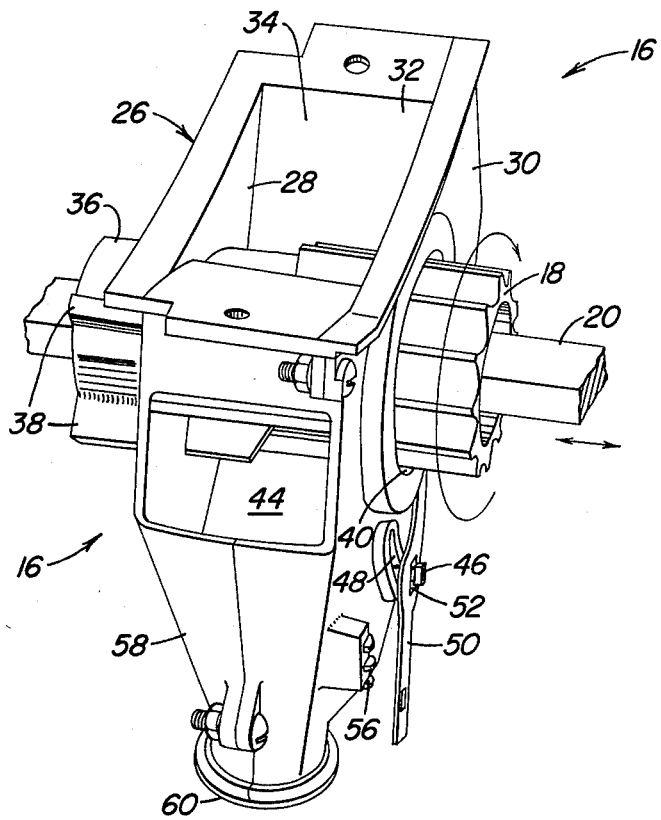
FIG. 2 is a perspective view of a seed cup assembly typical of the prior art.

The feed cup assembly 16 typical of the prior art (FIG. 2) and utilized on the commercially available John Deere model 8000 Grain Drill includes a rigid housing 26 having transversely spaced sidewalls 28 and 30 connected at their forward edges by a front wall 32 which extends downwardly and curves rearwardly from the forward portion of opening 34 which opens into the grain box structure 14. A transversely adjustable bearing 36 is supported in the sidewall 28 and supports the shaft 20 for rotation. The bearing 36 is keyed to the sidewall 28 by protrusions 38 to prevent relative rotation between it and the sidewall while permitting the bearing to slide transversely as the shaft 20 is moved axially to change the seed metering rate. A rosette-shaped rotating member or seed retaining ring 40 permits the fluted feed roll 18 to move axially with the shaft 20 while sealing the side of the assembly 16 against seed leakage. A separate bearing surface is required to prevent friction and wear between the ring 40 and the metal sidewall 30.

A metal metering gate 44 is pivotally connected at its forward edge to the sidewalls 28 and 30 adjacent the front wall 32. A connecting portion 46 extends outwardly from the feed roll side of the gate 44 through a slot 48 in the sidewall 30. A gate handle 50 is connected at its forward end for pivoting with respect to the sidewall 30 about an axis generally corresponding to the pivotal axis of the gate 44. An aperture 52 receives the connecting portion 46 of the gate 44, and as the handle 50 is pivoted, the gate 44 pivots with respect to the fluted feed roll 18. Retaining teeth 56 extend outwardly from the sidewall 30 to hold the gate handle 50 in one of several preselected positions depending on the size of the seed to be metered. The rear edge of the gate 44 is offset forwardly from rear wall 58 of the housing 26 so that as seed is directed from the front to the rear edge of the gate 44, it will fall downwardly over the rear edge and through aperture 60 into the corresponding seed tube 24 (FIG. 1). For small seeds such as wheat, oats, and rye the gate 44 is pivoted upwardly to move the front edge closer to the feed roll 18. When larger seeds such as peas or beans are being planted, the gate is pivoted downwardly away from the roll. With the prior art device shown in FIG. 2, foreign objects such as nuts or bolts which may fall into the seed box often become wedges between the fluted feed roll 18 and the gate 44 causing damage to the gate or other portions of assembly 16.

Figure 3:
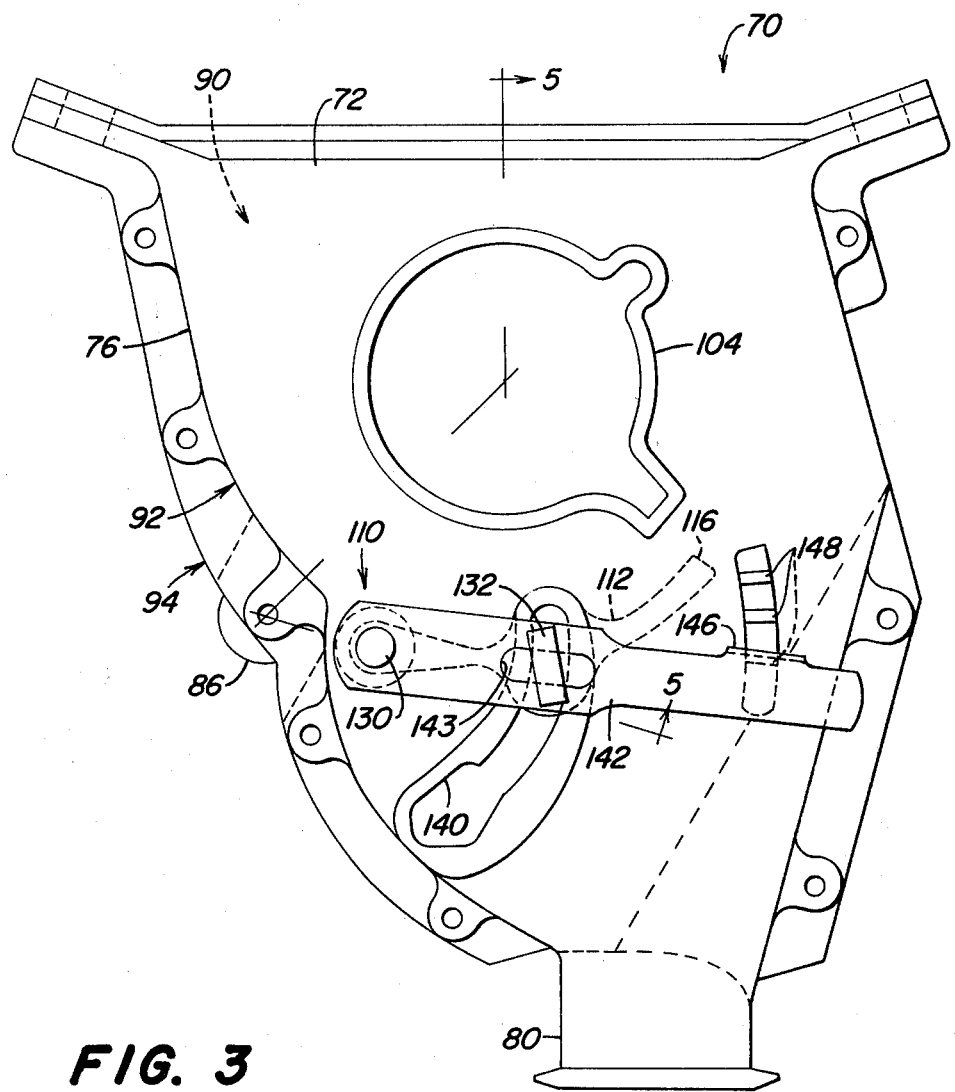
FIG. 3 is an enlarged view of the improved seed cup assembly of the present invention as viewed from the side which supports the metering gate adjusting handle.
Figure 4:
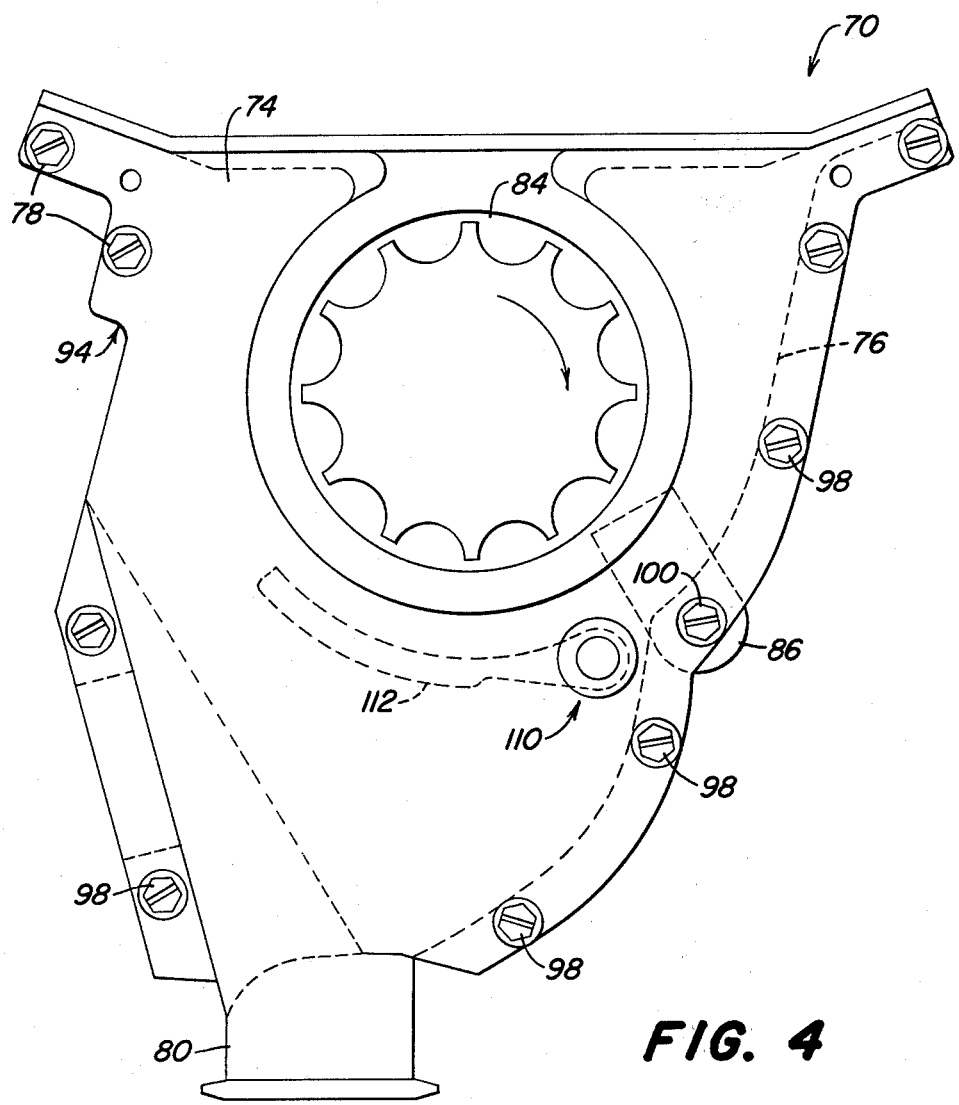
FIG. 4 is a view similar to FIG. 3 but taken from the opposite side of the assembly.
Figure 5:
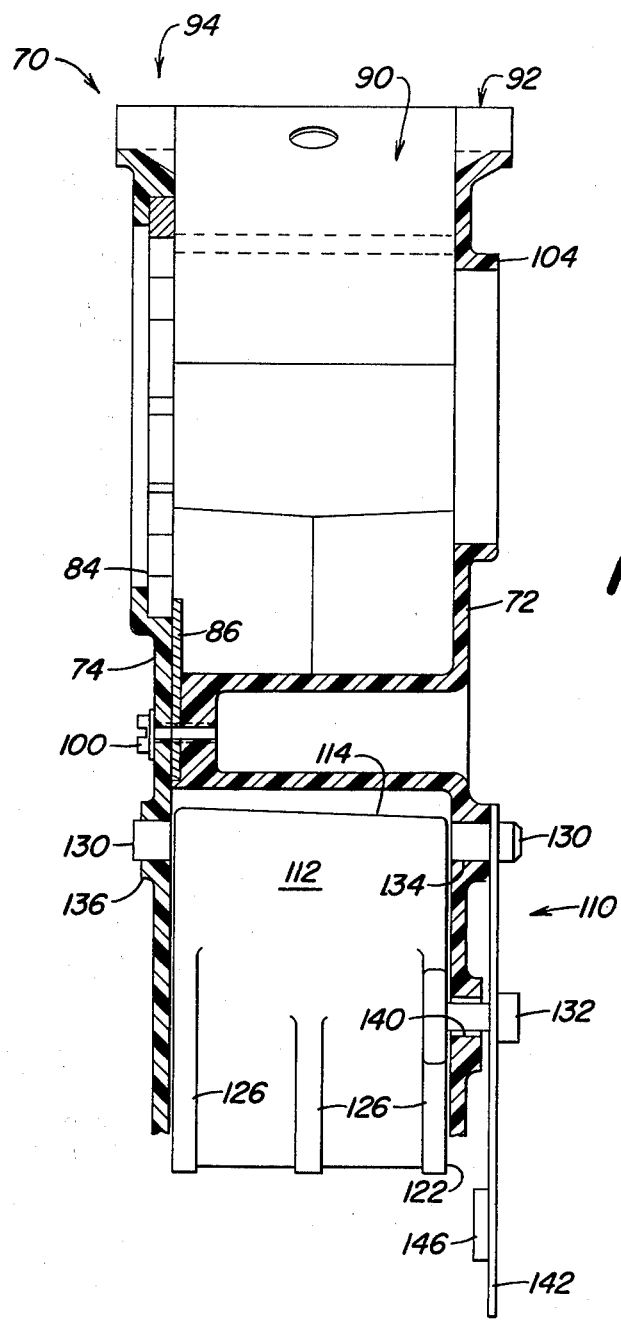
FIG. 5 is a cross section taken along lines 5—5 of FIG. 3.

The improved feed cup assemby 70 (FIGS. 3-5) includes opposite sidewalls 72 and 74 joined at their forward edges by a front wall 76. Lower portion 80 of the assembly 70 opens downwardly and is connected to the seed tube 24 (FIG. 1). The portion of the chamber defined between the sidewalls 72 and 74 which extends above the metering roll area opens upwardly into the seed box 14. A seed retainer ring 84 is held in position in the sidewall 74 by a metal strap 86. A metering compartment, indicated generally at 90, is formed between the sidewalls 72 and 74 of a pair of mating plastic sections 92 and 94 connected by screws 98. As best seen in FIG. 5, the strap 86 is sandwiched between the sections 92 and 94 and held in position by a screw 100. A transversely adjustable fluted feed roll and keyed bearing similar to that shown at 18 and 36 of FIG. 1 are supported by the ring 84 and reinforced sidewall structure 104 in the sidewalls 74 and 72, respectively. The retainer ring 84 rotates directly in contact with the plastic sidewall 74 which preferably is fabricated from acetal and does not require an additional bearing surface.

Figure 7:
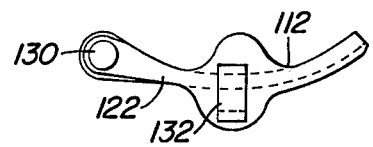
FIG. 7 is a side view of the gate shown in FIG. 6.
Figure 6:
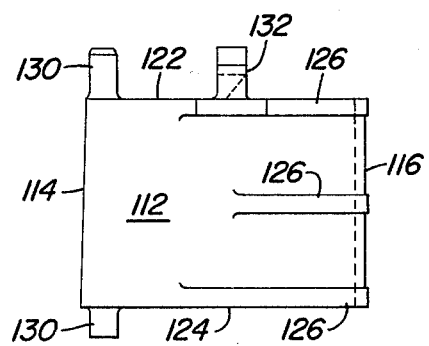
FIG. 6 is a top view of the adjustable feed gate of the assembly shown in FIGS. 3-5.

A feed gate assembly 110 is supported by the sidewalls 72 and 74 and includes a flexible feed gate or flap 112 preferably fabricated from glass-filled nylon. As viewed in FIG. 6, the gate 112 is generally rectangular and has first and second edges 114 and 116 and opposed sides 122 and 124. The gate 112 is upwardly concave (FIG. 7) and includes reinforcing ribs 126 near its sides and center. Pivot pins 130 are formed integrally with the gate 112 near its first edge 114. A connecting portion 132, also formed integrally with the gate 112, protrudes outwardly from the side 122 at a location generally centered between the edges 114 and 116. The above-described structure is particularly resistant to breakage, especially in the areas of the pins 130 and the connecting portion 132.

The pivots 130 are received in bearing surfaces 134 and 136 molded in the sidewalls 72 and 74, respectively. The connecting portion 132 is inserted through an arc-shaped slot 140 formed in the sidewall 72. A gate adjusting handle 142 is pivotally connected at one end to the pivot pin 130 and is constrained against the sidewall 72 by ends on the connecting portion 132 which project on either side of a slot 143 centrally located in the handle. The opposite end of the handle 142 includes an inwardly bent protrusion 146 which engages retaining teeth 148 molded in the sidewall 72. The handle 142 normally maintains the gate 112 in a preselected position relative to the fluted roll 18. By pulling outwardly on the end of the handle 142 and pivoting the handle up or down with respect to the retaining teeth 148, the setting of the feed gate 112 can be adjusted. As the feed roll 18 is rotated, seeds are directed generally along the front wall 76 and over the top of the arc-shaped portion of the gate 112 from the edge 114 to the edge 116. After passing the edge 116 the seeds drop into the lower portion 80 and into the seed tubes 24. The connecting portion 132 is located on the side of the assembly 70 which receives the sliding bearing so that the free edge 124 is located below the fluted feed roll 18. Therefore, if a large foreign object is forced between the feed roll and the top of the gate 112, the gate can flex to permit the object to pass through without damaging the plastic sidewalls 72 or 74 or the gate 112. The glass-filled nylon material from which the gate 112 is fabricated is sufficiently resilient to permit the objects to pass through, and thereafter it will return to its original preselected position determined by the setting of the gate-adjusting handle 142. Under normal operation when no foreign objects are present, the gate 112 does not flex away from its preselected position as seeds are swept from the first edge 114 to the second edge 116.

Having described the preferred embodiment, it will be apparent that modifications can be made without departing from the scope of the invention as defined in the accompanying claims.

I claim:

1. In an implement seed metering device including first and second opposed sidewalls and a metering roll supported between the sidewalls adjacent the first sidewall and rotatable about an axis generally transverse to the sidewall, said roll terminating inwardly of the second sidewall, an improved feed gate assembly comprising:

a resilient feed gate extending adjacent the metering roll between the sidewalls, said gate having a first end connected for pivoting about an axis parallel to the rotational axis and a second end opposite the first, said ends spaced by first and second side members extending generally along the first and second sidewalls, respectively, said first side member movable adjacent the first sidewall generally about the axis parallel to the rotational axis whereby said gate contains seeds adjacent the metering roll between the sidewalls, and means for pivoting the feed gate about the pivotal axis to adjust the position of the gate relative to the roll including a lever selectively positionable adjacent the second sidewall and means extending through the second sidewall for connecting the lever to the second side member between the pivotal connection and the second end to restrict the movement thereof relative to the metering roll and the first side member, wherein the first side member is substantially free to flex between the pivotal axis and the second end.

2. The invention as set forth in claim 1 wherein the feed gate is fabricated from glass-filled nylon.

3. The invention as set forth in claim 1 or 2 wherein the side members comprise ribs, said ribs being connected by web members having a thickness generally less than the thickness of the ribs.

4. The invention as set forth in claim 1 or 2 wherein the sidewalls are fabricated from plastic.

5. In an implement having a seed receiving tube, a seed storage area for receiving seeds and foreign objects generally larger than the seeds, an improved seed metering device comprising: a metering compartment comprising first and second sidewalls fabricated from plastic material, said compartment also comprising a first portion opening into the seed storage area and a second portion opening into the seed receiving tube; an adjustable and resilient feed gate supported from at least one of the sidewalls and located generally between the first and second portions, said gate including first and second edges located adjacent the first and second sidewalls, respectively; a fluted feed roll mounted within the compartment adjacent the feed gate between the sidewalls and the first and second portions for moving the seeds at a preselected rate from the metering compartment to the seed receiving tube; and means for normally maintaining the feed gate in a preselected one of a plurality of locations relative to the feed roll depending on seed size while permitting the gate to temporarily flex away from the roll as a foreign object is moved between the roll and the gate, said means for maintaining the gate comprising, a movable adjusting member supported adjacent the second sidewall, a connecting member extending through the second sidewall and constraining the second edge for movement with the adjusting member while permitting the first edge to flex with respect to the second edge and the adjusting member.

6. The invention as set forth in claim 5 wherein the fluted feed roll terminates axially inwardly from the second sidewall.

7. The invention as set forth in claim 5 or 6 wherein the feed gate is fabricated from glass-filled nylon, and the metering compartment is fabricated from acetal.

8. The invention as set forth in claim 5 or 6 wherein the feed gate comprises a glass-filled nylon web portion reinforced at its edges by ribs.

9. The invention as set forth in claim 8 wherein the connecting member is formed integrally with, and extends outwardly from, the second edge of the feed gate.

10. The invention as set forth in claim 5 or 6 further comprising seed retaining means mounted for rotation in, and in direct frictional contact with, one of the sidewalls for receiving the feed roll and rotating therewith to prevent seed leakage, and wherein said one of the sidewalls is fabricated from acetal.

* * * * *